March 25, 1941.　　　S. T. WILLIAMS　　　2,235,858
THREE-WAY DISTRIBUTING VALVE
Original Filed Nov. 30, 1938
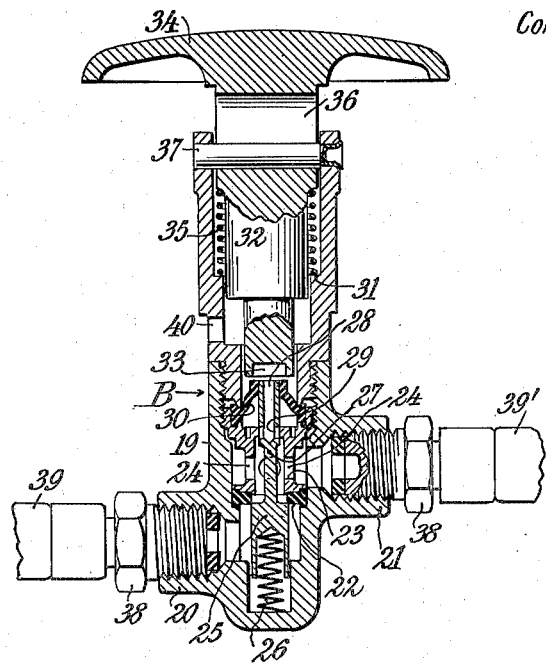
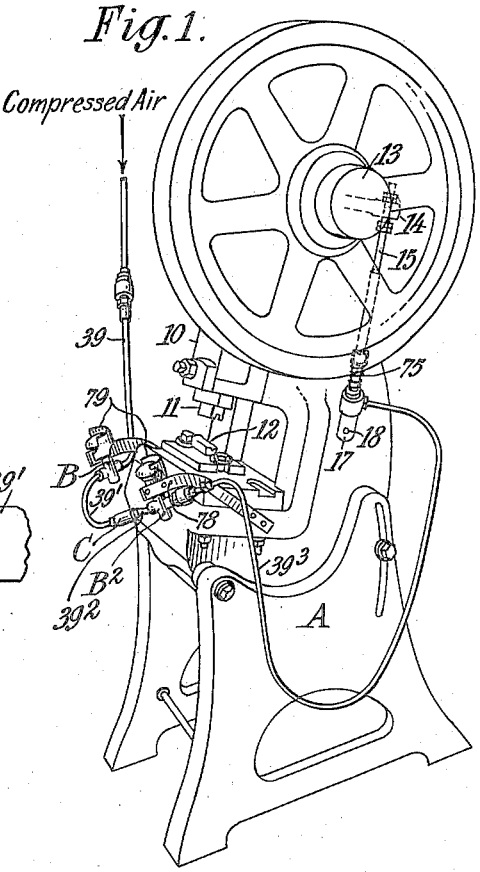
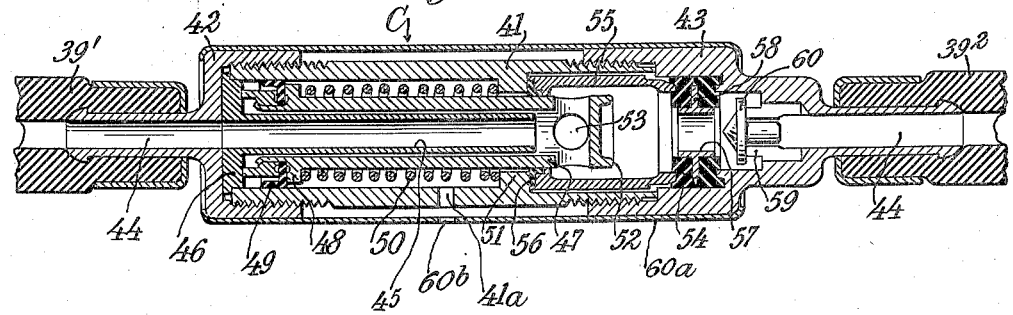
INVENTOR
Selden T. Williams.
BY
Fraser, Myers & Manley
ATTORNEYS.

Patented Mar. 25, 1941

2,235,858

UNITED STATES PATENT OFFICE 2,235,858

THREE-WAY DISTRIBUTING VALVE

Selden T. Williams, Bellerose, N. Y., assignor to Scovill Manufacturing Company, Waterbury, Conn., a corporation of Connecticut Original application November 30, 1938, Serial No. 243,220. Divided and this application January 3, 1940, Serial No. 312,231

4 Claims. (Cl. 277—21)

This application is a division of my prior application, Serial No. 243,220, filed November 30, 1938.

My present invention relates to a distributing valve intended for use in safety control devices for power presses and the like, and more particularly to such safety devices which are pneumatically controlled.

The prevention of injury to press operators of power presses has long received the attention of safety engineers and labor boards and much has been done to reduce the hazards of personal injury incident to press operations. Various forms of safety appliances in the nature of safety clutches, electrical devices, and mechanical shields, have been devised, and while these have met with varying degrees of success and recognition, on the whole they have been open to one objection or another. Among the primary objections met with by these safety devices are: (1) their tendency to slow down the press operations; (2) their high installation cost; (3) their non-foolproof character; and (4) their safety characteristics could be circumvented by an operator who desired to speed up production.

My present invention provides a three-way distributing valve as an essential element of a safety device for power presses and the like which overcomes the various objections and limitations above mentioned. In its underlying concept my invention embodies in combination with a novel form of cutout valve which relies upon compressed air to operate a plunger for tripping a clutch on the drive shaft of the press or for operating an equivalent means, a plurality of control or distributing valves so disposed with relation to the operating head of the press that both hands of an operator must be used to operate said valves and be well away from danger when doing so; and further, said valves are shielded so that they can not be accidentally operated. My invention is capable of installation on machines that are equipped with either non-repeat or repeating type clutches.

The principle, construction and operation of my invention will be better understood from the detailed description which follows when considered in connection with the accompanying drawing which shows a practical embodiment of my invention, and wherein:

Figure 1 is a perspective view of a power press showing my invention applied thereto.

Fig. 2 is a longitudinal section through one of the manually operable valves forming the essence of my invention herein claimed.

Fig. 3 is an axial section through an automatic pressure operated cut-out valve adapted for use with the present invention.

Although my invention is capable of use with any type of press or machine which has a movable head adapted to move toward and away from a complemental member and between which members the hands of an operator must be positioned in the handling of the work to be operated upon by the machine, I have shown my safety device applied to a power press A of conventional design having a movable head 10 which carries a die 11 for cooperation with a complemental die 12 mounted on the base of the press. The head 10 is reciprocable so as to bring the dies 11 and 12 into operative position to the work being acted upon, the reciprocation of the head 10 is provided by rotation of the shaft 13 upon which is mounted a clutch (not shown) of any approved type. As herein shown, the clutch is adapted to be tripped by a clutch trip 14 carried by a rod 15, one end of which carries a piston 16 mounted in a cylinder 17 which is shown as pivotally mounted at 18 to the press frame.

For operating the clutch trip only when the hands of the operator are well away from danger, I have provided a pair of manually operable valves B and B² and a cut-out valve C which form part of a pneumatic circuit adapted to establish fluid communication between the interior of the cylinder 17 with a source of compressed air. The structures and functions for the valves B, B², and C, will be presently described.

The manually operable three-way distributing valves B and B² are identical in construction and each consists of a hollow casing 19 having lateral tubular offsets or projections 20 and 21 providing induct and educt openings, respectively, in the casing. Within the casing between the lateral offsets is a shoulder upon which is mounted a valve packing seat 22 which is held in place by a tubular plug 23 having lateral openings 24 therein, the said plug being screw-threadedly or otherwise held in position within the casing. Mounted within the casing for engagement with the packing seat 22 is a valve check member 25, the lower portion of which is hollowed out and encloses a helical spring 26 for normally holding the valve against its seat. The valve check 25 above the seating portion thereof is formed with an axial pin 27, the upper end 28 of which is of tubular form and of a diameter to snugly slide through the axial opening in the tubular plug 23, and said tubular portion of the pin, at its lower end, is formed with lateral openings 29. To insure against leakage and to provide an air seal between the top of the tubular plug 23 and the top of the hollow portion 28 of the valve pin 27. I connect said parts together by a truncated cone-shaped, tubular packing 30. Any suitable means may be employed for holding this packing in contact with said parts, and as herein shown, the packing which is formed as a separate part has a sliding fit with the hollow portion of the valve check pin and is held in clamping engagement with the tubular plug 23 by a tubular member 31 which screw-threadedly engages within the casing 19. Mounted for telescopic movement within the tubular member 31 is a plunger 32, the inner end of which is recessed or formed with a socket 33 to engage over the open end of the hollow portion of the valve check pin and the free end of the tubular packing 30 to seal said open end of the valve pin when the plunger is depressed in the act of unseating the valve check 25. The plunger 32 is of a length to extend beyond the top of the tubular member 31 and is normally urged outwardly by a helical spring 35 mounted between a shoulder within the tubular member 31 and a shoulder on the plunger 32. For limiting the extent of the plunger movement and for holding it against separation from the tubular member 31, the plunger is formed with a slot 36 through which extends a pin 37 carried by the tubular member. For facilitating movement of the plunger by the hand of an operator, the plunger at its outer end is provided with an enlarged mushroom head 34. The tubular lateral offsets 20 and 21 are each threaded for connection with screw-threaded nipples 38, to which are attached sections of hose or flexible conduits 39, $39^1$, $39^2$, and $39^3$, forming a part of the pneumatic circuit. The tubular member 31 is also formed with a lateral opening or vent 40 which, it will be observed, provides open communication through the tubular portion 28 of the valve check pin and the lateral openings 24 in the tubular plug 23, with the bore through the lateral offset 21, the educt opening of the valve B, when the check valve 25 is seated. When the valve check 25 is unseated it will be appreciated that this open communication is cut off by the seal provided by the engagement of the lower end of the plunger 32 with the coned packing 30.

The automatic pressure operated cut-out valve C consists of a casing formed of a central substantially cylindrical tubular element 41, the ends of which are screw-threadedly connected to tubular end members 42 and 43, each of which terminates in an outwardly-directed nipple 44 to which an end of the conduits $39^1$ and $39^2$ are suitably connected. Mounted within the casing provided by the elements 41, 42, and 43, is a tubular member 45 having a bore substantially flush with the bore through the nipple end of the element 42 and having an outwardly directed flange 46 which is clamped against a flat surface in the element 42 by the screw-threaded connection between said elements 41 and 42. Surrounding the tubular element 43 in slightly spaced relation thereto is a tubular plunger check valve 47 which at its end adjacent the flange 46 is formed with a flange 48 and carries a piston packing 49 having a diameter to air-tightly move within the cylindrical bore of the element 41.

Surrounding the plunger check valve 47 and bearing at one end against the flange 48 is a helical spring 50, the opposite end of which bears against an inwardly-directed flange 51 on the tubular element 41 for the purpose of exerting a force upon the plunger valve for normally holding it in its unseated position as shown in Fig. 3. The plunger valve 47 at its other end is closed and formed with an annular ring 52 rearwardly of which the plunger valve is formed with lateral openings 53 leading from the interior of the tubular plunger to the duct through the cut-out valve. The closed end of the plunger valve is adapted to engage a valve seat packing 54 mounted within the tubular element 43 and held therein by a sleeve 55 which is clamped between the annular flange 51 and said packing in the assembly of the elements 41 and 43, there being also provided a packing 56 between the sleeve 55 and the flange 51, which packing engages the outer wall of the plunger valve 47 to provide an air-tight seal therewith. The packing 54 consists of two washers which are pressed over a tubular sleeve 57 having an outwardly-directed flange or rib 58 intermediate its ends. The element 43 between the nipple 44 thereon and the packing 54 therein is formed with a chamber having a spider 59 for guiding the stem of a floating valve 60, the face thereof which engages the packing 54 being of conical form and of smaller effective area than the opposite face of said valve. The function for this construction will presently be explained. To prevent tampering with the cut-out valve parts, they are housed within a shell 60a having a vent opening 60b. The tubular element 41 also has a vent opening 41a for permitting the venting of any air under pressure which may find its way into said element.

The manually operable distributing valves B and $B^2$ may be conveniently attached to the machine by means of brackets 78 which are bolted to the ends of the bed of the press. These brackets may also conveniently carry shields 79 which extend above and partially encircle the mushroom heads 34 of the valves B.

The device hereinbefore described is intended for tripping a clutch of the non-repeat type.

*Operation.*—The right hand operating valve $B^2$ must be pressed down slightly in advance of the left hand operating valve B or simultaneously therewith. When this is done the compressed air from the source passes through the pneumatic circuit into the cylinder 17 and forces the piston downwardly, which action trips the clutch and operates the press. When the operating valves B and $B^2$ are opened in the manner specified, a puff or surge of air passes through the pneumatic circuit to act upon the piston, and after so acting, the incoming air pressure operates to move the plunger valve 47 of the cut-out valve C against the seat 54, and said valve will remain seated so long as the left hand operating valve B is held open. When the hand is removed from the left hand operating valve B, the check valve 25 therein will seat under the force of the spring 26, the compressed air entrapped in the cut-out valve C will vent through the opening 40 in the valve B and permit the plunger valve 47 to unseat. When the hand is removed from the right hand operating valve $B^2$, the air from the cylinder 17 will vent through the opening 40 in said valve. As the air is released from the cylinder 17 the clutch trip 14 is returned to its operating position and the press cannot again operate until the clutch is again tripped.

If either of the manually operable valves B or $B^2$ is tied down or held down, the cut-out valve C functions to prevent the piston in the cylinder from operating the clutch, because, as above described, if the left hand valve B is held down, the plunger valve 47 will remain seated and prevent the passage of air through the pneumatic circuit to the cylinder, while if the right hand operating valve B² is held down, the press will operate once; and once only, as the check valve 60 of cut-out valve C holds the air in the piston and will not let it return. Furthermore, as the effective area of the valve 60 acted upon by the trapped back pressure in cylinder 17 is greater than the effective area of the seating face of said valve, it will be apparent that the incoming air through the cut-out valve C upon unseating of valve B will be insufficient to unseat the valve 60.

It will thus be seen that the safety device is effective to prevent press operation if any attempt is made by the press operator to have one of his hands free during the tripping of the press.

The safety device, it will be understood, is subject to modification in constructional features and to various uses within the range of engineering skill, without departing from the spirit of the invention.

What I claim is:

1. A distributing valve comprising a casing having therein a valve seat, a check valve normally held against said seat, an induct opening and an educt opening on opposite sides of the valve seat, a vent opening on the same side of the valve seat as the educt opening, a tubular plug for holding the valve seat in place, the valve check having a stem with a passage therein slidably extending through the tubular plug, said tubular plug having lateral openings therein establishing open communication between the educt opening and the passage in the valve check stem, and air sealing means between the tubular plug and the movable valve check stem.

2. A distributing valve according to claim 1, wherein the air sealing means between the tubular plug and the valve check stem is fixedly carried by the hollow plug and slidably engages the movable valve check stem.

3. A distributing valve comprising a casing having therein a valve seat, a check valve normally held against said seat, an induct opening and an educt opening on opposite sides of the valve seat, a vent opening on the same side of the valve seat as the educt opening, a tubular plug for holding the valve seat in place, the valve check having a stem with a passage therein extending through the tubular plug, said tubular plug having lateral openings therein establishing open communication between the educt opening and the passage in the valve check stem, a truncated conical tubular packing between the tubular plug and the movable valve check stem, the larger end of said packing being fixedly carried by the hollow plug and the other end of said packing slidably engaging the movable valve check stem and a secondary, normally unseated valve manually operable from the exterior of the casing having a socket adapted to engage over the open end of the movable valve check stem and the free end of the conical tubular packing adapted to close communication between the vent opening and the educt opening by closing the passage through the check valve stem and substantially simultaneously therewith unseat the first mentioned check valve.

4. A distributing valve comprising a casing having therein a valve seat, a check valve normally held against said seat, an induct opening and an educt opening on opposite sides of the valve seat, a vent opening on the same side of the valve seat as the educt opening, a tubular plug for holding the valve seat in place, the valve check having a stem with a passage therein extending through the tubular plug, said tubular plug having lateral openings therein establishing open communication between the educt opening and the passage in the valve check stem, air sealing means between the tubular plug and the movable valve check stem, and a secondary normally unseated valve manually operable from the exterior of the casing adapted to unseat the check valve and simultaneously engage the air sealing means between the movable stem of the check valve and the hollow plug to seal the passage in said stem and to close communication between the vent opening and the educt opening.

SELDEN T. WILLIAMS.